Dec. 25, 1928.
E. BROWN
MACHINE BEARING
Original Filed Feb. 18, 1926
1,696,667
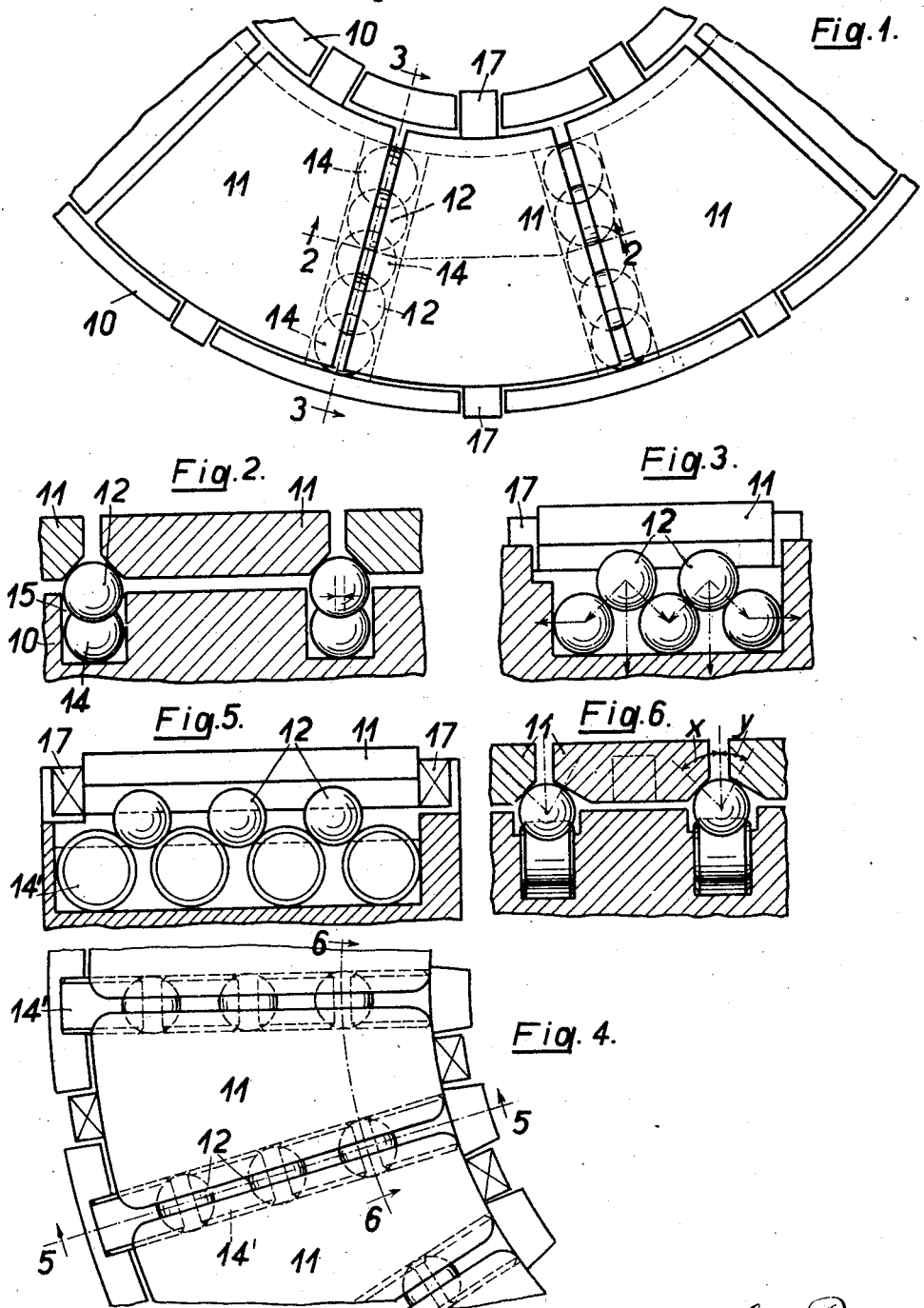

Patented Dec. 25, 1928.

1,696,667

UNITED STATES PATENT OFFICE.

ERIC BROWN, OF BADEN, SWITZERLAND, ASSIGNOR TO AKTIENGESELLSCHAFT BROWN BOVERI & CIE., OF BADEN, SWITZERLAND, A JOINT STOCK COMPANY.

MACHINE BEARING.

Application filed February 18, 1926, Serial No. 89,211, and in Germany February 25, 1925. Renewed November 3, 1928.

This invention relates to anti-friction machine bearings, particularly to thrust bearings.

The general object of the invention is to provide a bearing construction capable of sustaining very heavy loads without deformation and adapted to accommodate itself to the load in such fashion as to equalize loading over the bearing surfaces.

One of the more specific objects of the invention is the provision of a bearing construction particularly adapted for thrust bearings comprising a number of load supporting elements, wherein a uniform distribution or equalization of loading is accomplished automatically and universally among all the load supporting elements and wherein the respective load carrying elements are afforded flexible support in such fashion as to avoid their distortion or deformation under heavy loads.

Another object of the invention is the provision of a bearing construction of the type indicated, wherein the several load carrying elements are supported at a plurality of locii in such fashion as to accomplish an equalization of the load, not only as among one another, but also as between different portions of each.

A further object is the provision of a construction particularly adapted for lubrication of the bearing surfaces and the supports of the bearing elements.

A further object is the provision of a construction which is relatively simple, which requires minimum variety of parts, and which is of minimum bulk and maximum strength.

Other and further objects of the invention will be pointed out hereinafter, indicated in the appended claims, or obvious to one skilled in the art upon an understanding of the present disclosure. For the purpose of this application I have shown in the accompanying drawing forming a part of this specification two forms in which the invention may be embodied. It is to be understood, however, that these are presented for purpose of illustration only, and are not to be accorded any interpretation limiting the invention claimed, short of its true and most comprehensive scope in the art.

In the drawing,

Fig. 1 is a face view of a portion of the load carrying part of a thrust bearing illustrating features of the invention, Fig. 2 is a sectional detail on substantially line 2—2 of Fig. 1.

Fig. 3 is a sectional detail on substantially line 3—3 of Fig. 1.

Fig. 4 is a part face view of a modified construction.

Fig. 5 is a sectional detail on substantially line 5—5 of the same, and

Fig. 6 is a sectional detail on substantially line 6—6 of Fig. 4.

Referring to the illustrative form shown in Figs. 1, 2 and 3, let it be understood that the numeral 10 designates portions of the bed or base member of the bearing, and the numeral 11 designates load-carrying members or segments designed to receive on their faces the thrust or load of the supported machine part. These are supported on the bed or frame portion by a flexible automatically equalizing arrangement comprising the balls 12 and 14. These are retained in the grooves or guideways 15, which allow the balls freedom of movement both transversely and longitudinally to a limited extent. The balls 14 comprise a lower tier which rest upon the bottoms of the grooves, and the balls 12 constitute the upper or outer tier which find support on the balls 14. The segments 11 have their radial margins bevelled on the sides, the bevelled surfaces finding support on the balls 12 and by virtue of this arrangement, it will be observed, the support of the segments 11 is divided between the balls 12, the points of support being spaced apart a suitable distance. This qualifies the segments to sustain heavier loads without distortion or local deformation such as would be likely to occur if they had but one point of support upon which the load would be concentrated. At the same time, the respective segments are free to adjust themselves by such changes of relative elevation between the inner and outer portions as may be induced by the distribution of the load on their face surfaces, the flexible support afforded by the arrangement of balls 12 and 14 being effective to assume such position as will allow the segment to accommodate itself constantly to the load pressure. Moreover, with this arrangement, the distribution of the loading moments among the balls 12 and 14 is such as to progressively reduce the local loading. As illustrated by the arrows in Fig. 3, the pressure imposed on one of the balls 12 is transmitted by it to two of the balls 14 and equalized throughout the entire group. Likewise, because of the limited lateral movement afforded the balls 12, together with the inclined tangent contact surfaces of the segments 11, permit the latter to vary in adjustment about their radial axes in such fashion as to equalize the loading over their respective surfaces and throughout the entire interconnected or articulated series. The segments, it will be observed, are held within limits as to their lateral play, by the projections 17 which work in locating notches in the bed or frame portion.

In the form shown in the Figs. 4, 5 and 6, each of the segments 11 is afforded three points of support at each margin by the adjustable members 12, which exercise their equalizing effect on one another through the intermediate supporting members 14′, which are in the form of rollers movable radially of the bearing in suitable guide-ways in the housing. This arrangement has the advantage of still further reducing the localized loading and also in the elimination of side thrust between the upper and lower equalizing elements incident to the displacement of their centres out of the same plane. By varying the relative sizes of the angles $x$ and $y$ in forming the bevelled contact surfaces on the segments, an arrangement may be provided whereby the centre of pressure on the oil cushion which, in operation of the device, supports the cooperating thrust member on the surface of the segments 11, may be so displaced in the direction of motion as to give the effect of the contracting or wedge-shaped lubricating cushion characteristic of the Michell type of bearing.

It will be observed from the foregoing that each individual segment has complete universality of movement with equalization in all directions, and that equalization is afforded universally among all the segments. At the same time, there is a desirable distribution of the load sustained by each segment among several points of support, through which it is still further distributed among the other elements of the equalizing system. By virtue of the construction therefore, the invention affords means of increasing the load sustaining capacity of the bearing without necessitating a commensurate increase in its bulk. Because of the distribution of the pressure, the segments may be made wider and their number accordingly decreased. The simplicity of the construction contributes to strength and wear resistive ability and permits its being constructed with a minimum of diversified parts.

What I claim is:—

1. Machine bearing construction comprising segments having load supporting surfaces and contact surfaces extending obliquely at different angles to the load supporting surfaces, balls having rolling contact with the contact surfaces of adjacent segments to support them jointly, and shiftable equalizing members supporting the balls.

2. In a machine bearing construction, the combination with bearing segments having load supporting surfaces and contact surfaces extending at different angles to the load supporting surfaces, of movable sustaining members having rolling contact with contact surfaces on adjacent segments to support the segments jointly, said sustaining members being adjustable in a direction perpendicular to the load supporting surfaces.

3. In a thrust bearing, a base member provided on one side thereof with circumferentially-spaced guideways extending radially outwardly from substantially the center of said member, similarly spaced segments associated with said member at said side thereof and each being disposed between adjacent guideways and arranged with its opposite inner longitudinal edge portions overhanging such guideways and being complementary to such edge portions of the adjacent segments, means disposed in said guideways and having limited transverse and longitudinal movements therein and contacting with each of the associated complementary edge portions of said segments to support the latter in spaced relation with respect to said base member, and elements disposed in said guideways intermediate the bottoms thereof and said means, the elements in each guideway being relatively movable with respect to each other in a direction longitudinally of the guideway and providing a common support for said means and cooperating with the same to permit freely of such movements thereof.

4. In a thrust bearing, a base member provided on one side thereof with circumferentially-spaced guideways extending radially outwardly from substantially the center of said member, similarly spaced segments associated with said member at said side thereof and each being disposed between adjacent guideways and arranged with its opposite inner longitudinal edge portions overhanging such guideways and being complementary to such edge portions of the adjacent segments, balls disposed in said guideways and having limited transverse and longitudinal movements therein and contacting with each of the associated complementary edge portions of said segments to support the latter in spaced relation with respect to said base member, and elements disposed in said guideways intermediate the bottoms thereof and said balls, the elements in each guideway being relatively movable with respect to each other in a direction longitudinally of the guideway and having rolling contact with said balls such as to provide a support therefor while permitting of such movements of the same.

In testimony whereof I have hereunto subscribed my name at Zurich, Switzerland, on the 2nd day of February, A. D. 1926.

ERIC BROWN.